Figure 1:
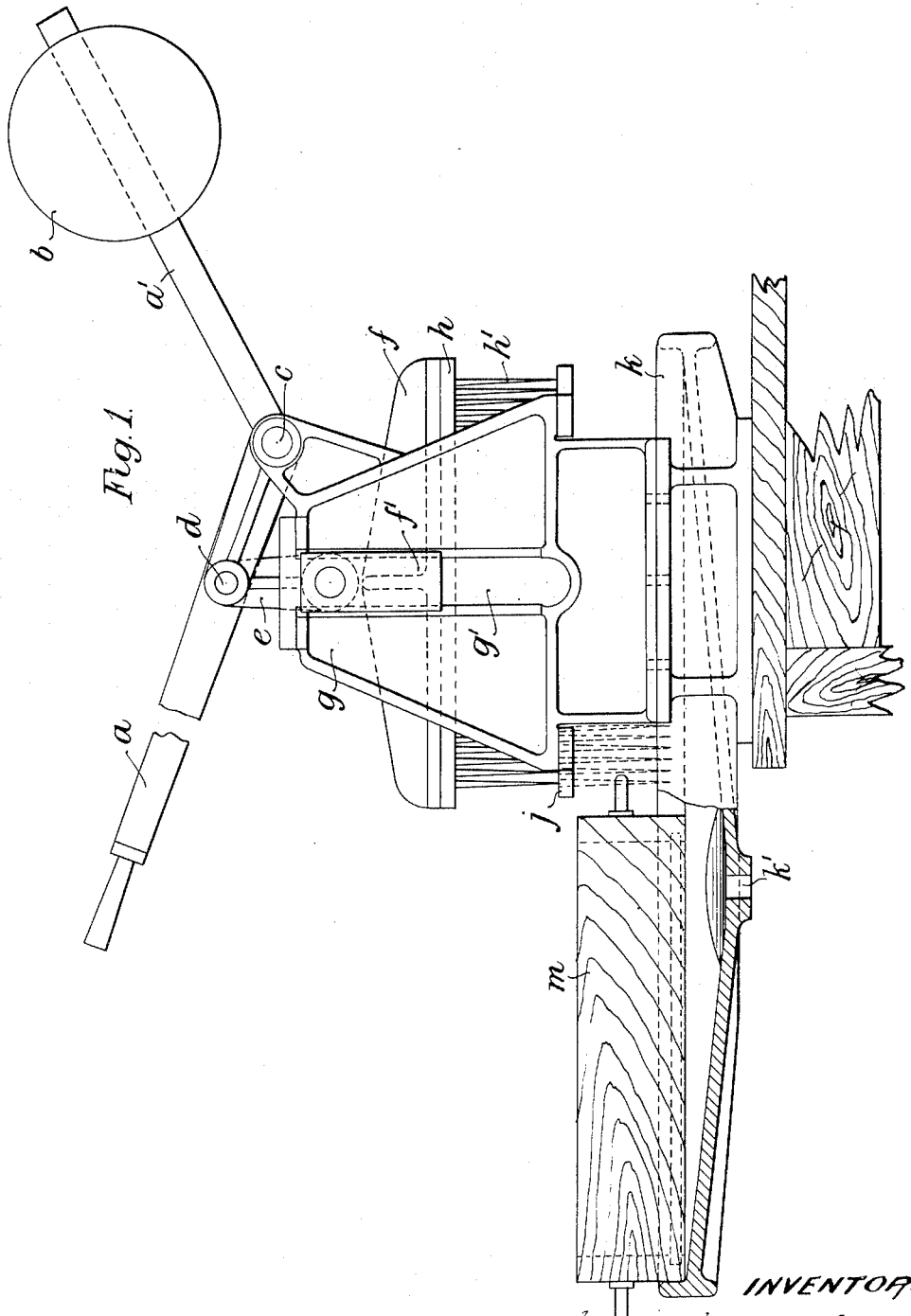

S. C. DAVIDSON.
TREATMENT OF RAW RUBBER WHEN FRESHLY COAGULATED FROM THE LATEX.
APPLICATION FILED FEB. 13, 1920.

1,388,453.

Patented Aug. 23, 1921.
3 SHEETS—SHEET 1.

INVENTOR:
Samuel Cleland Davidson
By Attys

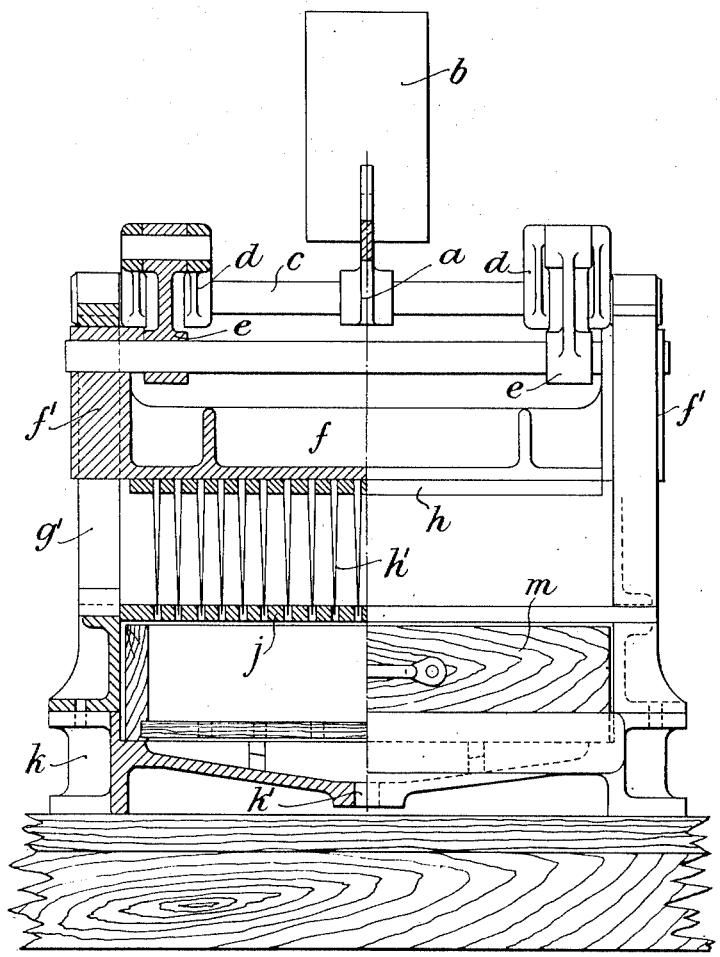

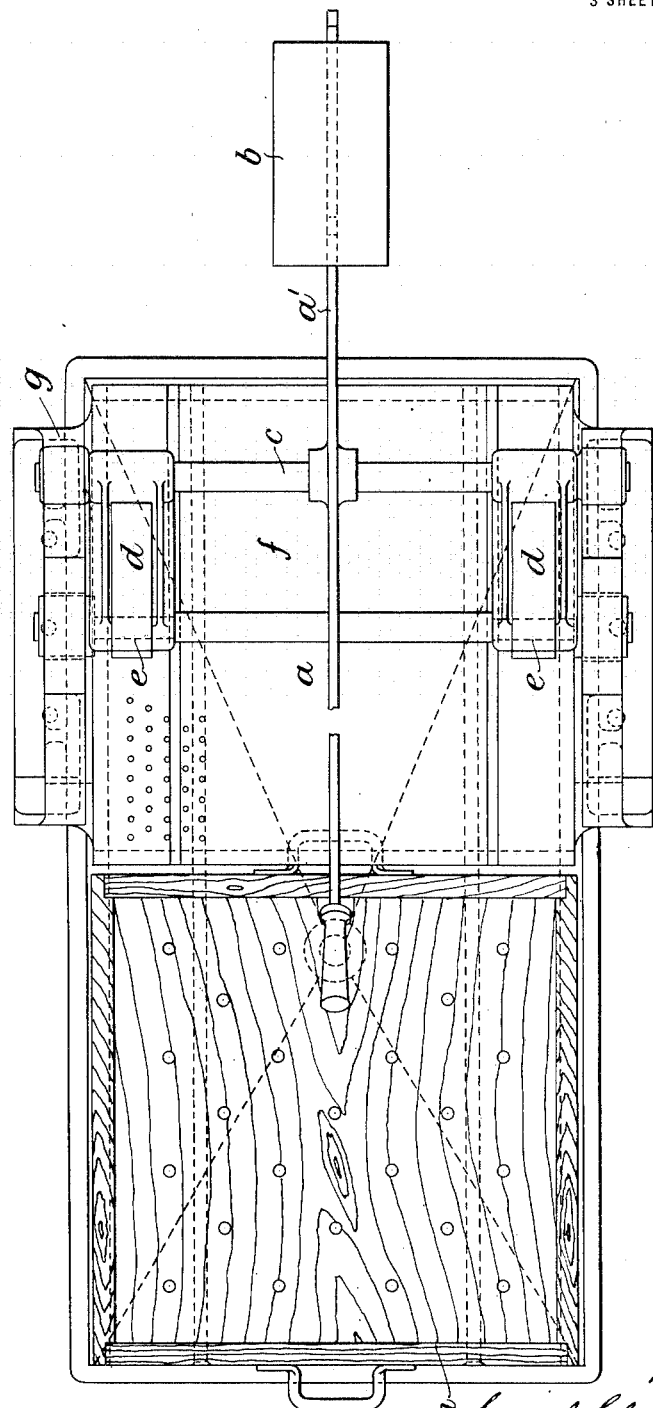

UNITED STATES PATENT OFFICE.

SAMUEL CLELAND DAVIDSON, OF BELFAST, IRELAND.

TREATMENT OF RAW RUBBER WHEN FRESHLY COAGULATED FROM THE LATEX.

1,388,453.  Specification of Letters Patent.  Patented Aug. 23, 1921.

Application filed February 13, 1920. Serial No. 358,441.

*To all whom it may concern:*

Be it known that I, SAMUEL CLELAND DAVIDSON, a subject of the King of Great Britain and Ireland, of Sirocco Engineering Works, Belfast, Ireland, merchant, have invented certain new and useful Improvements in the Treatment of Raw Rubber When Freshly Coagulated from the Latex, of which the following is a specification.

When raw rubber is freshly coagulated from the latex, it ordinarily contains a very large proportion of water, the removal of the main part of which has heretofore been usually done by at once passing the coagulated rubber through between rollers, and thereby subjecting it to gradually increasing pressure by bringing the rollers closer together each time it goes through between them, until it eventually attains a sheet-like form.

In this operation, however, it is difficult to prevent bubbles of air, or gas, and water from getting locked within the rubber, and the more resilient the quality of the rubber under treatment, the harder it is to burst these bubbles so as to let the contained air or gas and water, escape, consequently the rollers are commonly rotated at differential speeds with the object of more or less disintegrating the rubber, and tearing the bubbles open, as is done in the preparation of "crape" which, however, to a considerable extent also detrimentally affects what is termed the nerve of the finished rubber.

The object of my herein described invention is to provide a process and apparatus for the treatment of freshly coagulated raw rubber designed to quickly get rid of the main portion of the contained air, or gas, and water, in the rubber after it has been coagulated from the latex, and to thus minimize the formation of said bubbles during its subsequent treatment.

The process according to my invention, of eliminating the main bulk of the air, or gas, and water contained in rubber which has been freshly coagulated from its latex, consists in firstly subjecting said rubber in the form of a layer to the perforating effects of numerous sharply pointed pins forced through it from the one surface to the other, prior to completing its further manufacture in any preferred manner, substantially as hereinafter described.

In carrying my invention into effect, I firstly spread the coagulated rubber in as even a layer as practicable inside a shallow carrying frame (hereinafter called the carrying frame) and then perforate the layer from top to bottom with numerous fine perforations, by means of a group, or series of pins, (such, for example, as hackle pins) spaced at suitable distances apart, and mounted firmly at their thick ends in a movable plate (hereinafter called the pinplate) and having their sharp pointed ends projecting into, and, when operating, passing through guide holes in a fixed plate (hereinafter called the stripping-plate) which is so mounted that the carrying frame can freely slide under it when the pins are not projecting through, and, when the contained rubber is in suitable position, the pin-plate is pressed down until the pointed ends of the pins pass completely through the layer of rubber, and is then drawn up again, whereupon the rubber itself clings to the pins until it comes in contact with the fixed stripping plate, whereby the rubber is cleanly stripped off the pins, and left within the carrying frame as a slack fitting layer of considerably reduced thickness and of a somewhat mat-like form. The perforations thus made in it act as drainage tubes through which, owing to the contracting tendency possessed by the rubber itself, the greater part of the air, or gas, and water is expelled from the main body of the rubber, as well as from within such bubbles as have thus been perforated. Where the perforations are made so that there is a bottom outlet, the perforations need not pass completely through the rubber.

The carrying frame is then drawn out, and the perforated layer of rubber turned halfway around, either to right or left, and replaced in the frame, which is again pushed into position below the pin-plate, and the rubber is then perforated a second time, whereby owing to the suitable spacing apart of the pins from one another, the perforations already made will then be to such an extent out of register with the pins that, on the pin-plate being again pressed down, the new perforations will be intermediate between the first ones, so that the total number of same will thus be doubled.

The layer of rubber can now be turned right over so that its under surface will be uppermost, and then by further perforating it twice in the same way as already described, both sides of the mat will thus be similarly perforated, and the layer of rubber further reduced in thickness, owing to the additional dehydrating action which results from these last two operations, whereby the perforations made by the first operation are practically quadrupled.

The rubber may then be removed from the carrying frame, and, on being submitted to any suitable form of pressure, such, for example, as passing it between rollers revolving at equal speed, and with a lesser clearance space between them than the thickness of the layer of rubber, a further exudation of water from it takes place, and it can now be rolled into thin sheets, which are substantially free from bubbles, without subjecting it to any disintegrating or tearing treatment, after which it can be finished in any preferred way to prepare it for transmission to market.

In order that the nature of my invention may be clearly understood I will now describe one arrangement of apparatus, and the operation thereof, which has been used successfully in practically carrying out the above described treatment of rubber in accordance with my invention, this apparatus being illustrated in the accompanying drawings, in which Figure 1 is a side elevation shown partly in section; Fig. 2 is an end elevation partly in section, showing details of the movable pin-plate and stripper-plate; Fig. 3 is a plan.

Referring to the drawings, the apparatus comprises a handle lever $a$ with a back extension $a'$ carrying a balance weight $b$, the hand lever $a$ being pivoted on a spindle $c$ which transmits the pressure through the two side levers $d$ $d$, and the links $e$ $e$, to the movable carrier $f$ which is guided between the gables $g$ $g$ by means of the sliding blocks $f'$ working in the slots $g'$. The carrier $f$ has attached to its underside the pin plate $h$, the pins $h'$ of which project downward, and pass through the stripper-plate $j$. The gables $g$ are carried on the sides of the combined base plate and drain tank $k$ which is extended to the front of the machine to enable the carrying frame $m$ to be conveniently filled before being pushed into position below the stripper-plate $j$. All the water liberated from the material flows freely from it into the drain tank $k$ from which it escapes through the opening $k'$ to a collecting reservoir, or common drain, as the case may be.

The method of operation of the apparatus is as follows:—

The rubber after being coagulated from the latex is firstly placed in the carrying frame $m$ and pressed into a fairly flat layer by hand, or otherwise. The frame $m$ with the rubber in it is then pushed underneath the stripper-plate $j$, the hand lever $a$ is then pulled down, which causes the movable carrier $f$ with the pin plate $h$ to descend, forcing the pins $h'$ through the rubber, and, when the pins are drawn up again, the perforations in the rubber thus made act as drainage tubes through which a large portion of the water locked in the rubber very freely exudes. The bottom of the carrying frame is suitably grooved and perforated, to allow the liberated water to pass freely into the tank $k$. The lever $a$ when raised is retained in this position by the balance weight $b$ which allows the carrying frame to be withdrawn, and the perforated rubber, which is then in a mat-like form, can now be lifted and turned halfway around, or right over, and further perforated as hereinbefore already described, whereby the greater portion of the originally contained water is very rapidly eliminated.

The pins $h'$ may be of any suitable metal, but I preferably make them of phosphor bronze and the pin plate $h$ and stripper-plate $j$ of brass, in order to avoid any tendency to rusting due to the action of the coagulating agent previously added to the latex.

It will be obvious that the above described perforating treatment could be performed by means of mechanical devices of different construction and design, but, for the purpose of explaining how my invention can be carried into practical effect, I have described above and illustrated in the drawing a convenient arrangement of apparatus for the purpose. It will be understood, however, that I in no sense restrict myself to the use of this particular arrangement, because any other suitable arrangement of pin perforating apparatus may be employed for this purpose.

What I claim and desire to secure by Letters Patent is:—

1. The process of eliminating air, gas and water contained in raw rubber after being freshly coagulated from the latex, which consists in perforating the rubber in the form of a layer completely through, from its top to bottom surface, with numerous perforations and thus forming drainage tubes through the rubber which after the perforating pins have been withdrawn allow the air, gas and water to escape therefrom, due to the contracting tendency possessed by the rubber itself, without requirement for any special extracting apparatus.

2. Apparatus for eliminating air, gas, and water, contained in raw rubber which has been freshly coagulated from the latex, comprising the combination with a receiver for the rubber to be treated, a pin plate, pins fixed to the pin plate, means for supporting the receiver in line with the pin plate, and means for pressing the pin plate and receiver together and apart to force the pins through the rubber and to again withdraw the pin plate.

3. Apparatus for eliminating air, gas, and water contained in raw rubber which has been freshly coagulated from the latex, comprising the combination of a base plate, a pin plate, a number of pins fixed in the pin plate, a stripper plate having holes therein corresponding to the pins of the pin plate, a receiver for the rubber to be treated, a support on the tank for the receiver to one side of the pin plate, means for guiding the receiver under the carrier and pin plate and means for pressing the pin plate and receiver together and apart to force the pins through the rubber and for again withdrawing the pin plate.

4. Apparatus for eliminating air, gas, and water contained in raw rubber which has been freshly coagulated from the latex, comprising the combination with a base plate, of a drain tank, supports fixed to the base plate and extending above the drain tank, a movable carrier, a pin plate attached to the carrier, a number of pins fixed in the pin plate, a stripper plate fixed to the supports, holes therein corresponding to the pins of the pin plate, a movable receiver for the rubber to be treated, a support on the tank for the receiver to one side of the carrier, means for guiding the receiver under the carrier and pin plate, bearings for the carrier, a spindle in said bearings, levers fixed upon the spindle, links connecting the levers with the movable carrier, an operating part fixed upon the spindle, and a counterweight for easing the lifting of said pin-plate upon its up-stroke.

5. Apparatus for eliminating air, gas and water contained in raw rubber which has been freshly coagulated from the latex, comprising the combination with a base plate, a receiver for the rubber to be treated, a pin plate, pins fixed to said pin plate, means for forcing said pin plate and pins completely through the rubber in the receiver, a perforated stripper plate through which the pins enter the layer of rubber and which strips the rubber off the pins, and thus allows the contained air, gas and water to escape through the perforations thus made without requiring any expelling means.

6. The process of eliminating air, gas and water contained in raw rubber after being freshly coagulated from the latex, comprising producing drainage openings therein having an outlet at points permitting drainage by gravity of the water in the mass, assisted by the contracting tendency of the plastic mass.

7. The process of eliminating air, gas and water contained in raw rubber after being freshly coagulated from the latex, comprising producing cavities in the mass thereof opening at the bottom of the mass, whereby air, gas and water may escape therefrom assisted by the contracting tendency of the plastic mass.

In witness whereof I have hereunto signed my name in the presence of two subscribing witnesses.

SAMUEL CLELAND DAVIDSON.

Witnesses:
 ALFRED AGAR,
 GERARD W. MATTHEW.